UNITED STATES PATENT OFFICE.

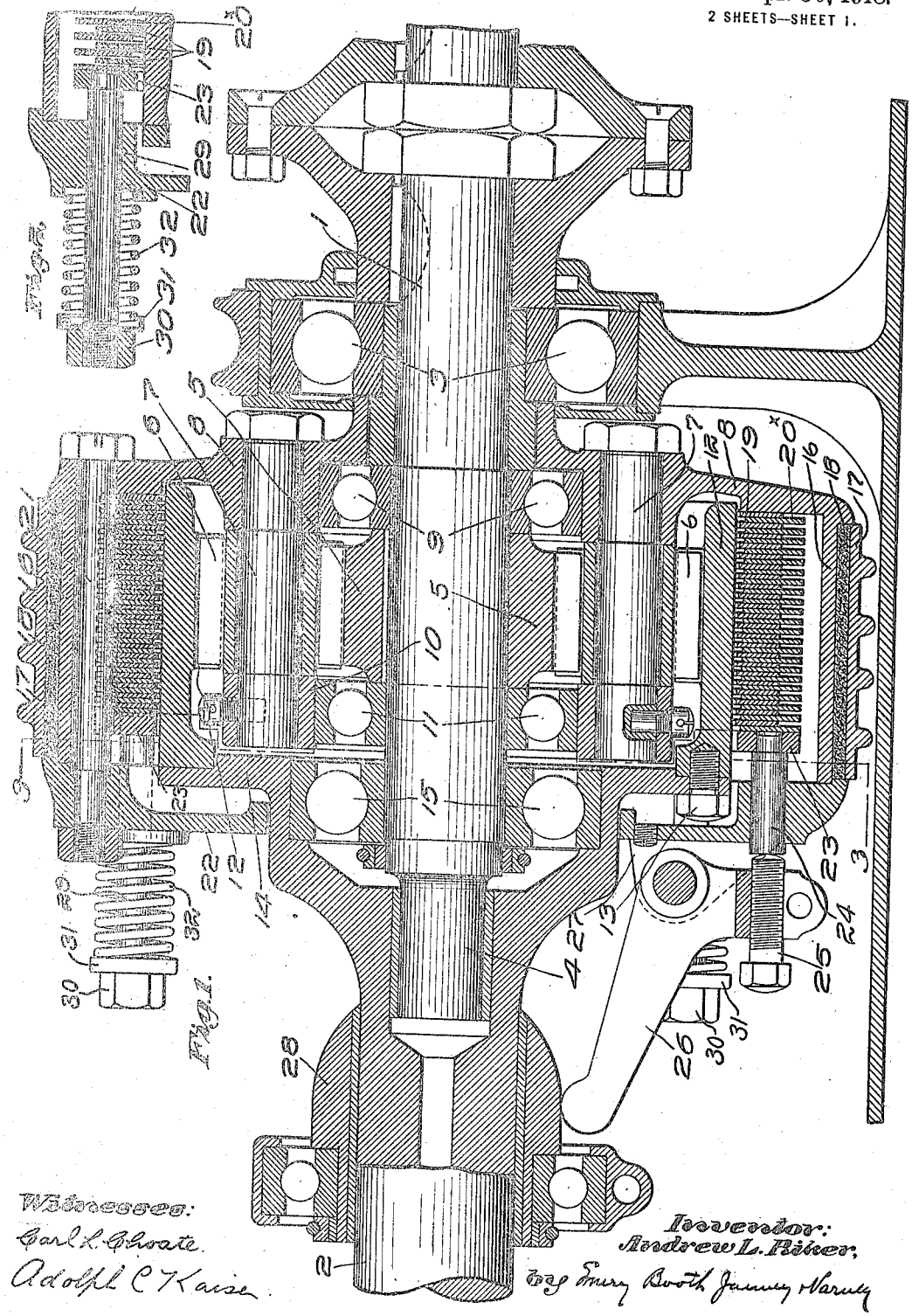

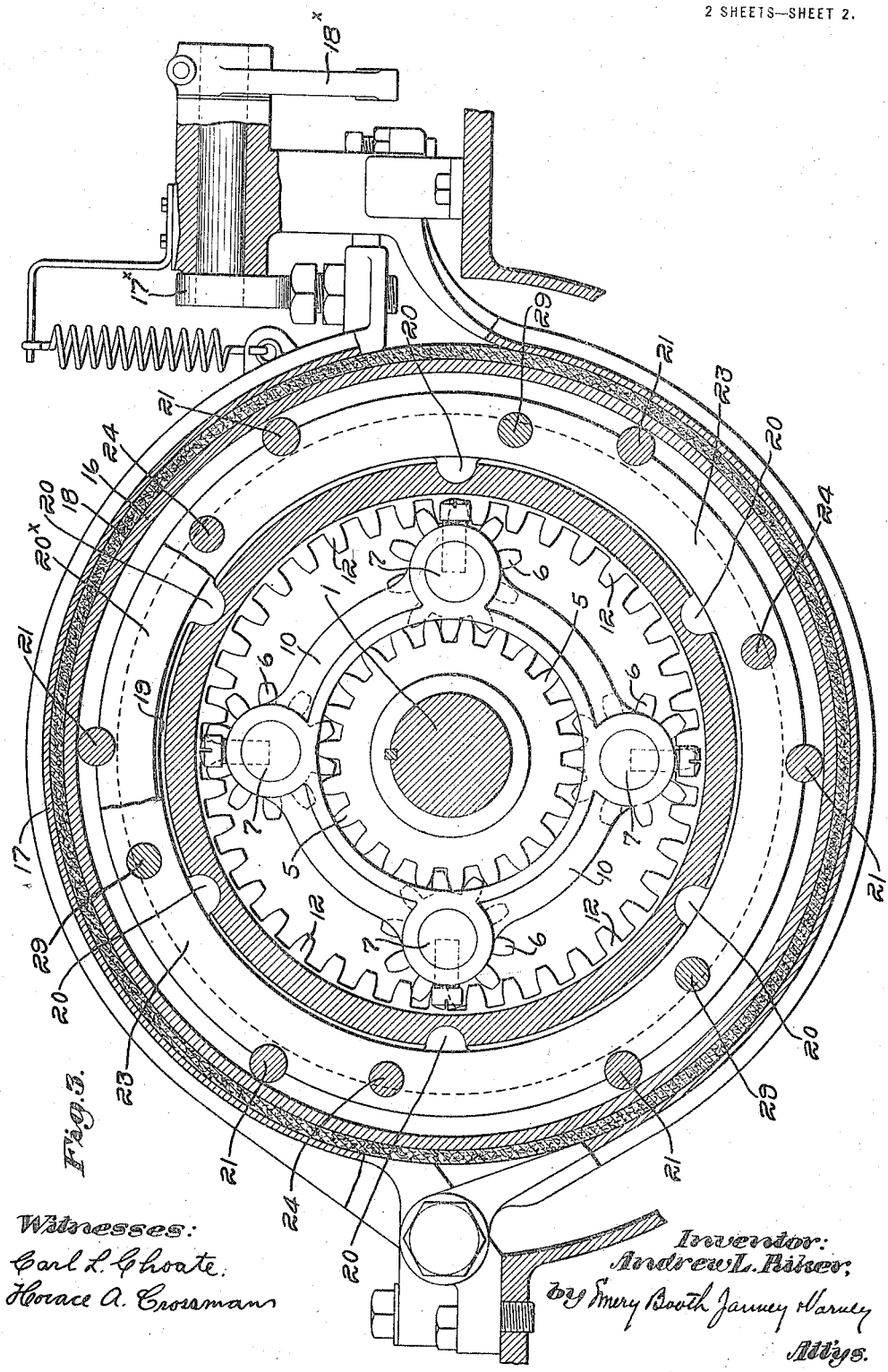

ANDREW L. RIKER, OF BRIDGEPORT, CONNECTICUT, ASSIGNOR TO THE "LOCOMOBILE" COMPANY OF AMERICA, OF NEW YORK, N. Y., A CORPORATION OF WEST VIRGINIA.

POWER-TRANSMISSION GEARING.

1,264,561.   Specification of Letters Patent.   Patented Apr. 30, 1918.

Application filed October 9, 1911. Serial No. 653,535.

*To all whom it may concern:*

Be it known that I, ANDREW L. RIKER, a citizen of the United States, and a resident of Bridgeport, county of Fairfield, State of Connecticut, (whose post-office address is Bridgeport, Connecticut,) have invented an Improvement in Power-Transmission Gearing, of which the following description, in connection with the accompanying drawings, is a specification, like characters on the drawings representing like parts.

This invention relates to power transmission gearing, being more particularly intended to provide a simple and compact, yet efficient, form of transmission gearing where it is required to vary the speed of transmission or reverse the direction of rotation as in the case of automobiles, motor boats and the like.

The invention will be best understood by reference to the following description when taken in connection with the accompanying illustration of one specific embodiment thereof, while its scope will be more particularly pointed out in the appended claims.

In the drawings:

Figure 1 is a vertical, central, sectional elevation showing the principal working parts of a transmission gearing embodying one form of the invention;

Fig. 2 is a sectional detail showing one of the clutch relieving springs;

Fig. 3 is a transverse sectional end view taken on the line 3—3 in Fig. 1.

Referring to the drawings and to the illustrative embodiment of my invention there shown, there is disclosed a driving member 1 which may, for example, be the driving shaft of the internal combustion engine of a motor boat or a shaft driven therefrom, and a driven member 2, which may, for example, be the propeller shaft of the boat. The driving shaft 1 is journaled in ball bearings 3 having its extreme end telescoped with and journaled in the driven shaft 2. At an intermediate point it has geared thereto the pinion 5 which latter meshes with one or more, herein four, pinions 6, (see Fig. 3). The pinions 6 are journaled each upon a stud shaft 7, the latter held at one side of the pinion in the rotative member 8 carried by the ball bearings 9 and at the other side by the ring member 10 journaled upon the ball bearings 11. The member 8 constitutes the rotatable member of the planetary gearing and is freely rotatable with reference both to the driving shaft 1 and the driven shaft 2.

Meshing with the pinions 6 is the internal gear 12, the latter fixedly secured in any suitable way, as by the bolts 13, to the plate 14, which latter is fixed upon the end of the driven shaft 2 and has a bearing support upon the ball bearings 15.

With the construction so far as described, when the driving shaft is turned, the pinions 6 turn and cause the rotatable member to turn idly upon its bearings without effecting movement of the driven shaft 2. Means are provided, however, whereby a reverse movement of the driven shaft may be had at a slower speed, or on the other hand, a direct drive of the driven shaft may be had at the same or a lesser speed than that of the driving shaft.

To provide means for securing the reverse movement of the driven shaft, means are provided for opposing the movement of the rotatable member 8. To this end the latter is provided with a drum-like formation 16 which encircles the internal gear 12, but leaves an annular space between the exterior of the gear and the interior of the drum for a purpose to be described. The outer face of the drum 16 is grooved and has applied thereto the band brake 17 provided with the brake lining 18 whereby the rotatable member may be held fixed or its movement checked by applying the brake band. The latter may be of any suitable or usual construction, and is shown controlled by the cam 17× and lever 18×.

To cause the driven shaft to be driven by the driving shaft in the same direction, means are provided for clutching the internal gear to the drum 16 so that the gearing elements being locked each to the other, they all turn together and the driving member drives the driven member directly. If desired, the one may be clutched to the other with more or less slippage to provide for a speed of the driven member less than that of the driving member. In the illustrated embodiment of the invention the clutching of the gear to the drum is effected by a clutch of the multiple disk type.

Referring to the drawings, it will be seen that the exterior of the internal gear member 12 is provided with a series of annular disks 19 rotatably fixed thereon. These may be formed out of sheet metal and secured to the gear in any desired way, but herein, as shown in Fig. 3, they are each formed with a key or feather 20 which is fitted to a corresponding groove in the outer face of the internal gear member.

The members of this series of annular disks 19 are alternated with the members of a second series of disks 20×, which latter are rotatably fixed to the interior of the drum 16 so that when pressed laterally they may be forced into frictional engagement with the disks 19, and the gear thereby clutched to the drum. To rotatably fix the disks 20× in the drum, any suitable means may be employed but herein the periphery of each disk is notched or grooved at six equally distant points and the grooves seat against studs 21 which extend through the drum. The open end of the drum is covered by the annular plate 22 secured thereto by the studs 21.

To force the disks into engagement each with the other there is provided a follower ring 23 which bears against the outer one of the series. The latter has fixed thereon a number of plunger pins 24, herein three in number, which project outwardly through the plate 22, each having its end registering with a member such as the adjustable screw 25 whereby pressure may be applied to the ring. Referring to Fig. 1, each screw 25 is carried in one arm of the bell crank lever 26, the latter pivoted upon the lug 27 formed upon the plate 22. The opposite arm of the bell crank lever rests against the curved end of the sleeve 28, the latter adapted to be slid along the driven shaft 2 by a suitable clutch lever, not herein shown. As the sleeve 23 is moved to the right (as viewed in Fig. 1) the engaging ends of the bell crank levers 26 are moved outwardly and the screws 25 pressed toward and against the plunger pins 24 so that the ring 23 is forced inwardly and more or less pressure applied to the multiple disk clutch.

Means are provided tending to draw the ring 23 away from the disks so that when the sleeve 28 is moved to the left (as viewed in Fig. 1) the friction between the disks will be instantly relieved. For this purpose the ring 23 also has secured thereto (see Figs. 1 and 2) a series (herein three) of rods 29, the outer ends of which are threaded to receive a nut 30 and washer 31 between which and the plate 22 there is provided in each case a compression spring 32 tending to move the ring away from the disks.

The operation of the transmission device will be readily understood. With the driving shaft revolving in any given direction, the driven shaft is at rest so long as both the brake and the clutch are released. When the brake is applied, the rotatable member 8 is slowed down or stopped entirely, causing the internal gear and the driven shaft to turn at a slow rate of speed in a direction opposite to that of the driving shaft. When the brake is released and the clutch applied, the parts are locked together and the driven shaft turned with and in the same direction as the driving shaft. With the clutch partly applied, more or less slippage may be permitted and the driven shaft turned in the same direction as the driving shaft, but at a lesser speed.

It will be observed that the construction of the clutching devices and their relation to the gearing elements make the mechanism compact while at the same time mechanically strong and effective.

While for purposes of illustration I have herein shown and described one specific form of the invention, it is to be understood that the same is submitted for illustrative purposes and that extensive deviations may be made from the illustrated embodiment without departing from the spirit thereof.

Claims:

1. The combination with a driving member of a driven member, planetary gearing between the same comprising a pinion secured to one member, an internal gear secured to the other member, a rotatable member, one or more pinions thereon meshing both with said pinion and said gear, said rotatable member having also a drum encircling said gear, a band brake for said drum, and clutching means between said drum and said gear comprising a series of annular disks fixed upon the outside of the internal gear and an alternating series of annular disks fixed upon the interior of the drum, means for pressing said disks laterally into contact each with the adjacent one comprising a follower ring, pins secured thereto, bell crank levers for moving said pins, a sliding member for moving said levers, and means for freeing said disks comprising one or more pins secured to said ring and springs engaging the same to pull the ring away from the disks.

2. The combination with a driving member of a driven member, planetary gearing between the same comprising a pinion secured to one member, an internal gear secured to the other member, a rotatable member, one or more pinions thereon meshing both with said pinion and said gear, said rotatable member also having a drum encircling said gear, brake means for opposing movement of said drum, clutching means between said drum and said gear comprising a series of annular disks fixed on the outside of the internal gear, an alternating series of annular disks fixed upon the interior of the drum, and means for pressing said disks together.

3. The combination with a driving member of a driven member and a planetary gearing train between the same comprising a driving gearing member, a driven gearing member, a rotatable member, a third gearing member carried by the rotatable member, means for opposing movement of the rotatable member, a pair of said elements having concentric drum members provided respectively with multiple internal and external annular disks fixed thereon, and means for pressing said disks into contact.

4. The combination with a driving member of a driven member and a planetary gearing train between the same comprising a pinion, an internal gear, one or more pinions meshing both with said internal gear and first-named pinion, a rotatable member carrying said last-named pinion or pinions, means for opposing movement of said rotatable member, a pair of said gearing elements having drum-like members, and multiple disk clutching means between said drum-like members.

5. The combination with a driving member, of a driven member and a planetary gearing train between the same having gearing elements comprising a pinion, an internal gear, a rotatable element, one or more pinions carried thereby and meshing both with said internal gear and the first-named pinion, one of said gearing elements being the driving member, another the driven member, and the third an idle member adapted to be held fixed or allowed to rotate, means for opposing movement of said idle member, one of said members having an outer drum, another of said members having an inner drum, and a series of clutching members between the same for clutching one drum to the other.

6. The combination with a driving member, of a driven member and a planetary gearing train between the same having gearing elements comprising a pinion, an internal gear, a rotatable element carrying one or more pinions meshing both with said internal gear and the first-named pinion, one of said gearing elements being the driving member, another the driven member, and the third an idle member adapted to be held fixed or allowed to rotate, means for opposing movement of said idle member, one of said members having an outer drum, another of said members having an inner drum, a series of annular disks rotatably fixed on the interior of the outer drum, an alternating series of similar disks rotatably fixed on the exterior of the inner drum, and means for pressing said disks into contact.

7. The combination with a driving member of a driven member, a planetary gearing train between the same comprising a pinion and internal gear, a rotatable member, one or more pinions carried thereby and meshing with said first named pinion and said internal gear, said gear, first named pinion and rotatable member being rotatable about the same axis, brake means for opposing movement of said rotatable member at will said rotatable member and internal gear having drums concentrically arranged and in radial alinement with reference to said first named pinion and to each other, clutching means located between the peripheries of said drums, and clutch operating and thrust receiving means carried by the same drum.

8. The combination with a driving member of a driven member, a planetary gearing train between the same comprising a pinion and internal gear, a rotatable member, one or more pinions carried thereby and meshing with said first named pinion and said internal gear, said gear, first named pinion and rotatable member being rotatable about the same axis, brake means for opposing movement of said rotatable member at will, said rotatable member and internal gear having drums concentrically arranged with reference to said first named pinion and to each other, clutching means between the drums comprising series of annular disks, one series secured to one of said drums and the other series of disks being secured to the other drum, and means for pressing said disks together independently of the operation of said brake means.

9. The combination with a driving member, of a driven member and a planetary gearing train between the same comprising a pinion, an internal gear, one or more pinions meshing both with said internal gear and said first-named pinion, a rotatable member carrying said last-named pinion or pinions, means for opposing movement of said rotatable member, a pair of said gearing elements having drum-like members, multiple disk clutching means between said drum-like members, means for pressing the disks into contact and spring means for freeing said disks.

10. In a device of the class described a driving pinion, a driven gear member, planetary pinions between the same, a rotary carrying member for said pinions, brake means for said carrying member, said carrying member having an extended portion inclosing said driven gear member and forming an inclosing casing for the gearing train, clutch disks within said casing connected with said carrying member and arranged for axial movement relatively thereto, coöperating disks connected with said driven gear member and arranged for axial movement relative thereto and means for actuating said disks independently of axial movement of the gearing elements.

11. In a device of the class described, driving and driven shafts, an epicyclic train between the same comprising a driving gear, a driven gear member and an intermediate gear-carrying member, said elements being relatively immovable axially, said gear-carrying member having an extension inclosing said driven member and forming an inclosing casing for the gearing and clutching means housed within said casing for transmitting movement between the shafts in the same rotative sense.

12. In a device of the class described, driving and driven shafts, an epicyclic train between the same comprising a driving gear, a driven gear member and an intermediate gear-carrying member, said elements being relatively immovable axially, said gear-carrying member having an extension inclosing said driven member and forming an inclosing casing for the gearing and clutching means housed within said casing for transmitting movement between the shafts in the same rotative sense, and comprising clutch disks axially movable relative to the gearing elements and plunger pins extending through the casing for operating the same.

13. In a device of the class described, driving and driven shafts, an epicyclic train between the same comprising a driving pinion, an internal gear, planet pinions, a carrying member therefor, a cylindrical flange on said member surrounding the internal gear, a flange extending inwardly therefrom, said member and flanges providing an inclosing casing for the gearing, clutching means within said casing comprising disks rotatable with but axially movable relative to said member, and coöperating disks rotatable with but axially movable relative to the driven shaft, and means for operating the disks independently of axial movement of the gearing elements.

14. In a device of the class described, driving and driven shafts and an epicyclic train between the same comprising a driven gear, an internal gear and a pinion-carrying disk opposed to said internal gear, said latter two elements having spaced cylindrical portions and radial flanges closing the annular space between the cylindrical flanges, a band brake encircling the pinion-carrying element, coöperating clutch disks on said cylindrical portions and inclosed within said space and plunger pins entered through one of the radial flanges for operating said disks.

In testimony whereof, I have signed my name to this specification, in the presence of two subscribing witnesses.

ANDREW L. RIKER.

Witnesses:
W<small>M</small>. S. T<small>EEL</small>, Jr.,
B. J. C<small>ONNOLLY</small>.

Copies of this patent may be obtained for five cents each, by addressing the "Commissioner of Patents, Washington, D. C."